US010472430B2

(12) United States Patent
Thielen et al.

(10) Patent No.: US 10,472,430 B2
(45) Date of Patent: Nov. 12, 2019

(54) POLYACRYLONITRILE-SULPHUR COMPOSITE HAVING INCREASED CAPACITY

(71) Applicant: Robert Bosch GmbH, Stuttgart (DE)

(72) Inventors: Joerg Thielen, Stuttgart (DE); Marcus Wegner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 223 days.

(21) Appl. No.: 15/366,770

(22) Filed: Dec. 1, 2016

(65) Prior Publication Data
US 2017/0158783 A1    Jun. 8, 2017

(30) Foreign Application Priority Data

Dec. 3, 2015 (DE) .................... 10 2015 224 194

(51) Int. Cl.
| | |
|---|---|
| C08F 8/48 | (2006.01) |
| H01M 4/62 | (2006.01) |
| H01M 4/60 | (2006.01) |
| H01M 4/38 | (2006.01) |
| H01M 4/36 | (2006.01) |
| H01M 4/13 | (2010.01) |
| C08J 3/24 | (2006.01) |
| C08F 8/34 | (2006.01) |
| C08J 3/20 | (2006.01) |
| C08K 3/06 | (2006.01) |
| H01M 10/052 | (2010.01) |

(52) U.S. Cl.
CPC .............. C08F 8/48 (2013.01); C08F 8/34 (2013.01); C08J 3/203 (2013.01); C08J 3/243 (2013.01); C08K 3/06 (2013.01); H01M 4/13 (2013.01); H01M 4/362 (2013.01); H01M 4/38 (2013.01); H01M 4/382 (2013.01); H01M 4/602 (2013.01); H01M 4/62 (2013.01); C08F 2810/20 (2013.01); C08J 2333/20 (2013.01); H01M 10/052 (2013.01)

(58) Field of Classification Search
None
See application file for complete search history.

(56) References Cited

U.S. PATENT DOCUMENTS

| 9,252,425 B2 | 2/2016 | Wegner et al. | |
|---|---|---|---|
| 2013/0029222 A1* | 1/2013 | Niwa | C08F 8/34 |
| | | | 429/211 |
| 2015/0044545 A1 | 2/2015 | Liu et al. | |
| 2015/0111100 A1* | 4/2015 | He | H01M 4/1399 |
| | | | 429/213 |

FOREIGN PATENT DOCUMENTS

| DE | 102011075053 A1 | 11/2012 |
|---|---|---|
| DE | 102011075056 A1 | 11/2012 |
| DE | 112011101347 T5 | 1/2013 |
| DE | 102012209642 A1 | 12/2013 |
| DE | 102012213219 A1 | 1/2014 |
| EP | 2337126 A1 | 6/2011 |

OTHER PUBLICATIONS

Ji, et al. "A highly ordered nanostructured carbon-sulphur cathode for lithium-sulphur batteries", Nature Materials, vol. 8 (2009), pp. 500-506.
Wang, et al. "A Novel Conductive Polymer-Sulfur Composite Cathode Material for Rechargeable Lithium Batteries", Adv. Mater,m 14, No. 13-14 (2002), pp. 963-965.
Wang, et al. "Sulfur Composite Cathode Materials for Rechargeable Lithium Batteries", Adv. Func. Mater., 13, No. 6 (2003), pp. 487-492.
Yu, et al. :"Lithium storage in conductive sulfur-containing polymers", J. Electroanalytical Chem., 573 (2004), pp. 121-128.
Yu, et al. "Stable-cycle and high-capacity conductive sulfur-containing cathode materials for rechargeable lithium batteries", J. Power Sources 146 (2005), pp. 335-339.

* cited by examiner

*Primary Examiner* — Christopher P Domone
(74) *Attorney, Agent, or Firm* — Norton Rose Fulbright US LLP; Gerard Messina

(57) ABSTRACT

A method of producing a cross-linked polyacrylonitrile-sulfur composite material, in which polyacrylonitrile is reacted with sulfur and at least one cross-linking agent to form a cross-linked polyacrylonitrile-sulfur composite material and the cross-linking agent includes at least one functional group, selected independently of one another from an ethylenically unsaturated functional group, an epoxy group and a thiirane group. In addition, the invention relates to a polyacrylonitrile-sulfur composite material, a cathode material, an alkali metal-sulfur cell or an alkali metal-sulfur battery as well as to an energy store.

27 Claims, No Drawings

POLYACRYLONITRILE-SULPHUR COMPOSITE HAVING INCREASED CAPACITY

CROSS REFERENCE

The present application claims the benefit under 35 U.S.C. § 119 of German Patent Application No. DE 102015224194.7 filed on Dec. 3, 2015, which is expressly incorporated herein by reference in its entirety.

FIELD

The present invention relates to a method for producing a cross-linked polyacrylonitrile-sulfur composite material, a cross-linked polyacrylonitrile-sulfur composite material, a cathode material, an alkali metal-sulfur cell or alkali metal-sulfur battery and an energy store.

In order to produce batteries having a markedly greater specific energy, currently research is being conducted in lithium-sulfur battery technology (abbreviated: Li/S). If the positive electrode (also called cathode below) of a lithium-sulfur cell consisted entirely of elemental sulfur, in theory, an energy content of more than 1,000 Wh/kg could be achieved. However, elemental sulfur is neither ionically nor electrically conductive, so that additives must be added to the cathode which markedly lower the theoretical value. Moreover, elemental sulfur is conventionally reduced to soluble polysulfides $S_x^{2-}$ when discharging a lithium-sulfur cell. These are able to diffuse into regions such as the anode region, in which they are no longer able to participate in the electrochemical reaction of the subsequent charge/discharge cycles. During the charge process, the soluble polysulfides may be reduced again at the negative electrode (also called anode below). This may result in the formation of shorter, still soluble chains, which diffuse again to the cathode and there are oxidized again (polysulfide shuttle). The charging efficiency is thereby markedly reduced. It is also known that a great quantity of electrolyte is required in order to utilize the sulfur as completely as possible. An electrolyte/sulfur ratio of >4:1 is not unusual in this context. In practice, the specific energy of lithium-sulfur cells is therefore markedly lower and is currently estimated at up to 400 Wh/kg.

Various concepts exist for raising the sulfur utilization. Nazar et al. describe in Nature Materials, vol. 8, June 2009, 500-506, that carbon tubules promote retention of polysulfides in the cathode space and at the same time ensure sufficient electric conductivity.

Wang et al. describe in Advanced Materials, 14, 2002, No. 13-14, pp. 963-965 and Advanced Functional Materials, 13, 2003, No. 6, pp. 487-492, and Yu et al. describe in Journal of Electroanalytical Chemistry, 573, 2004, 121-128 and Journal of Power Sources, 146, 2005, 335-339 another technology in which polyacrylonitrile (abbreviated: PAN) is heated with an excess of elemental sulfur, the sulfur, on the one hand, being cyclized to form a polymer having a conjugated $\pi\pi$-system while forming $H_2S$ polyacrylonitrile, and, on the other hand, being bonded in the cyclized matrix.

Methods for producing polyacrylonitrile-sulfur composite materials are described, for example, in German Patent Application Nos. DE 11 2011 101 347 T5 and DE 10 2012 209 642 A1, European Patent Application No. EP 2 337 126 A1, and U.S. Patent Appl. Pub. No. US 2015/0044545 A1. The quantities of sulfur that are able to be bonded covalently to the polyacrylonitrile-sulfur composite using the known methods are limited, however, and normally are in the range of 35 to 40% by weight. An object of the present invention is therefore to provide a polyacrylonitrile-sulfur composite material that has a higher content of bonded, in particular covalently bonded, sulfur. This object may be achieved in accordance with example embodiments of the present invention described below.

DETAILED DESCRIPTION OF EXAMPLE EMBODIMENTS

The present invention is a method for producing a polyacrylonitrile-sulfur composite material, polyacrylonitrile being reacted with sulfur and a cross-linking agent to form a cross-linked polyacrylonitrile-sulfur composite material.

A cross-linked polyacrylonitrile-sulfur composite material (vSPAN) may be understood in particular as a cross-linked polyacrylonitrile-sulfur composite material that is produced by a reaction of polyacrylonitrile (PAN) with sulfur (S) and a cross-linking agent (V).

The sulfur atoms may be linked in the cross-linked polyacrylonitrile-sulfur composite material both directly, by covalent sulfur-carbon bonds, and indirectly by one or more covalent sulfur-sulfur bonds and one or more sulfur-carbon bonds to an in particular cyclized carbon skeleton. The carbon skeleton is in this instance formed by cyclized polyacrylonitrile.

In the process, at least a portion of the sulfur atoms of the polyacrylonitrile-sulfur composite material, for instance in the form of polysulfide chains, may be covalently linked to a cyclized polyacrylonitrile or to a cross-linking agent molecule. The sulfur chains are thus mutually linked via the cross-linking agent molecules such that individual sulfur chains are lengthened or cross-linked to one another. Accordingly, the term "cross-linking agent" is understood in the context of the present invention in such a way that a cross-linking agent is suitable for linking at least two sulfur atoms to one another.

In polyacrylonitrile-sulfur composite materials cross-linked in this manner there thus exist indications of sulfur-carbon bonds that bind the polysulfides firmly to the polymer matrix. Consequently, a cross-linked polyacrylonitrile-sulfur composite material having various chemical bonds is formed, which may all have different properties and contributions with reference to electrochemical performance and aging behavior.

Using a method described below, it is possible to produce a cross-linked polyacrylonitrile-sulfur composite material having a particularly defined structure, a high sulfur content and a good electrochemical cycle stability, which is in particular suitable for producing an active material for a cathode, of a lithium-sulfur battery, that has long-term stability and in which a greatest possible proportion of the active material may be utilized electrochemically over a long period.

In detail, in the method of the invention, sulfur reacts with polyacrylonitrile and a cross-linking agent.

Cross-linking agents suitable for the method of the present invention are characterized by the fact that they have at least one functional group, selected from an ethylenically unsaturated group, an epoxy group and a thiirane group. The cross-linking agent preferably includes at least two such functional groups. If the cross-linking agent includes at least two functional groups, these may be selected respectively independently of one another from an ethylenically unsaturated group, an epoxy group and a thiirane group.

In a preferred specific embodiment, the cross-linking agent includes at least one functional group selected from an ethylenically unsaturated functional group, an epoxy group and a thiirane group, preferably at least two functional groups selected independently of one another from ethylenically unsaturated functional groups, epoxy groups and thiirane groups. Suitable cross-linking agents include for example one to six, in particular two to four, preferably two to three such functional groups. In a particularly preferred specific embodiment, the cross-linking agents include two ethylenically unsaturated functional groups.

Preferably, aromatic or aliphatic hydrocarbon compounds having at least two functional groups, selected independently of one another from ethylenically unsaturated groups, epoxy groups and thiirane groups are used as cross-linking agents. For example, aromatic or aliphatic hydrocarbon compounds having two to five, in particular having two, three or four functional groups are used. In a particularly preferred specific embodiment, the cross-linking agent includes two functional groups, in particular two ethylenically unsaturated functional groups.

Examples of suitable cross-linking agents are aromatic and aliphatic hydrocarbon compounds having at least one ethylenically unsaturated functional group (one terminal double bond), one epoxy group (one three-membered heterocycle including one oxygen atom and two carbon atoms) and/or one thiirane group (a three-membered heterocycle including one sulfur atom and two carbon atoms). The hydrocarbon compounds may possibly be substituted, for example with halogen atoms or hydroxyl groups. The hydrocarbon compounds may also include additional functional groups such as, e.g., carbonyl groups, thiocarbonyl groups, carboxyl groups, thiocarboxyl groups, ether or thioether.

Suitable aliphatic hydrocarbon compounds include preferably 3 to 30 carbon atoms, in particular 3 to 16 carbon atoms, and may be linear or branched, saturated or unsaturated.

Examples of aliphatic hydrocarbon compounds having at least one ethylenically unsaturated functional group are allyl acrylate, allyl ether, diallyl ether, divinyl ether and similar compounds.

Examples of aliphatic hydrocarbon compounds having at least one epoxy group are monoglycidyl acrylate or polyglycidyl acrylate, monoglycidyl ether or polyglycidyl ether, oxirane-terminated oligomers and similar compounds.

Examples of aliphatic hydrocarbon compounds having at least one thiirane group are monothiiranyl methyl acrylate or polythiiranyl methyl acrylate, monothiiranyl methyl ether or polythiiranyl methyl ether, thiirane-terminated oligomers and similar compounds.

In a particularly preferred specific embodiment, aromatic hydrocarbon compounds having at least one functional group, selected from an ethylenically unsaturated group, an epoxy group and a thiirane group are used as cross-linking agents. Aromatic hydrocarbon compounds having at least two functional groups, selected independently of one another from ethylenically unsaturated groups, epoxy groups and thiirane groups are particularly suitable. The functional groups are preferably contained in a substituent including 2 to 8, in particular 2 to 4 carbon atoms, which is bonded to the aromatic ring structure. If more than one such subtituents exists on the aromatic ring structure, these may be situated with respect to one another in ortho-, meta- or para-position, in particular in meta- or para-position, of the aromatic ring structure.

Suitable aromatic hydrocarbon compounds include preferably 8 to 16 carbon atoms, in particular 10 to 14 carbon atoms.

Examples of preferred cross-linking agents having ethylenically unsaturated functional groups are styrol, o-, m- and p-divinylbenzene, o-, m- and p-diallylbenzene, o-, m- and p-diisopropylenebenzene, o-, m- and p-di-n-butylenebenzene, o-, m- and p-diisobutylenebenzene. Particularly preferred are p-divinylbenzene and m-diisopropylenebenzene.

Examples of preferred cross-linking agents having epoxy groups include styrene oxide, o-, m- and p-dioxiranylbenzene, o-, m- and p-diglycidylbenzene, o-, m- and p-diglycidyloxybenzene, o-, m- and p-dioxiranyl pyridine, o-, m- and p-diglycidyl pyridine and o-, m- and p-diglycidyloxy pyridine.

Examples of preferred cross-linking agents having epoxy groups include styrene sulfide, o-, m- and p-dithiiranyl benzene, o-, m- and p-dithiiranyl methyl benzene, o-, m- and p-dithiiranyl methyl oxo benzene, o-, m- and p-dithiiranyl pyridine, o-, m- and p-diglycidyl methyl pyridine and o-, m- and p-dithiiranyl oxo pyridine.

Particularly preferred are aromatic hydrocarbon compounds having at least one, preferably at least two ethylenically unsaturated functional groups.

In a preferred specific embodiment, the cross-linking agents have a boiling point of more than 180° C., preferably more than 200° C., in particular more than 230° C. at a given reaction pressure.

Within the scope of one specific embodiment, elemental sulfur is used, for instance, sublimed elemental sulfur. Elemental sulfur, particularly sublimed elemental sulfur, is advantageously cost-effective and comparatively simple to handle. Fundamentally, it is also possible, however, to use sulfur compounds, especially those that react with the cyclized polyacrylonitrile or the cross-linking agent molecules while developing a covalent sulfur-carbon bond.

In particular, it is possible to use the sulfur suitably in excess.

In connection with another specific embodiment, the proportion of sulfur used in the method in relation to the total quantity of used sulfur and polyacrylonitrile is ≥50% by weight, in particular ≥60% by weight, for example ≥70% by weight, for example ≥75% by weight, and/or ≤95% by weight, in particular ≤93% by weight or ≤90% by weight. These quantitative ratios have proven suitable for carrying out the method according to the present invention.

In connection with another specific embodiment, the proportion of cross-linking agent used in the method in relation to the total quantity of used sulfur and cross-linking agent is ≥0.1% by weight, in particular ≥0.5% by weight and/or ≤50% by weight, in particular ≤20% by weight or ≤10% by weight. For example, the cross-linking agent is used in a quantity of ≥1% by weight and ≤5% by weight in relation to the total quantity of used sulfur and cross-linking agent. These quantitative ratios have proven suitable for carrying out the method according to the present invention.

Furthermore, to produce cross-linked polyacylonitrile-sulfur composite materials, temperatures are advantageously used that are at least temporarily in a range of greater than or equal to 300° C., in particular of greater than or equal to 350° C. The reaction temperature preferably does not exceed 550° C. In particular, a reaction temperature of less than or equal to 525° C. is advantageous. A particularly advantageous temperature range is greater than or equal to 400° C. to smaller than or equal to 500° C. This allows for a reaction of sulfur and polyacrylonitrile to occur at particularly good conversions and furthermore allows for a cross-linked polyacrylonitrile sulfur composite material having a particular good rate capability to be achieved. In other words, for the purely exemplary case of a use as active material in a lithium-sulfur battery, it is possible to achieve a particularly good charge and discharge behavior.

The reaction may be carried out, in this instance, in less than 12 h, particularly less than 8 h, for instance, in 5 h to 7 h, for example in about 6 h. In one specific embodiment, the reaction of the reactants, in particular the reaction of the sulfur with the polyacrylonitrile, is able to occur in different steps at different reaction temperatures. In particular, during the reaction, a first temperature may be set, for instance, in a range from greater than or equal to 400° C. to smaller than or equal to 550° C., and a second temperature may be set, which is lower than the first temperature, for example in a range from greater than or equal to 300° C. to smaller than or equal to 400° C. In this context, the phase within which the second temperature is set, may in particular be longer than the phase in which the first temperature is set. The time sequence of the temperature ranges in this connection is not fixed by the designations of first and second temperature range. Thus, the reaction may first be performed at a temperature that corresponds to the second temperature range and subsequently at a temperature that corresponds to the first temperature range.

By the first temperature phase, a cyclization of the polyacrylonitrile may be effected. During the second temperature phase, essentially the development of covalent sulfur-carbon bonds may occur. Because of the fact that in this instance a lower temperature is set, longer polysulfide chains may be linked to the cyclized carbon skeleton.

The method may furthermore include a step in which the sulfur is reacted with the cross-linking agent in the presence of polyacrylonitrile, in particular in the presence of cyclized polyacrylonitrile, or a polyacrylonitrile sulfur composite material at a temperature in a range from ≥120° C. to ≤250° C., in particular from ≥150° C. to ≤250° C., for example from ≥180° C. to ≤200° C. At this temperature, covalent bonds may be advantageously developed between the sulfur and the carbon of the cross-linking agent. Because of the fact that in this instance a lower temperature is set, longer polysulfide chains may be linked to the cross-linking agent.

The reaction may take place temporarily or entirely in an inert gas atmosphere, for example in an argon or nitrogen atmosphere.

In order to improve the reaction speed and the conversion, the reaction may be carried out in the presence of a catalyst. Suitable catalysts are known from the technical field of rubber vulcanization. The reaction is therefore preferably carried out at least temporarily in the presence of a vulcanization catalyst or a vulcanization accelerator. In order to lower the reaction speed or to terminate a reaction phase having a reaction speed that is increased, for example by the catalyst, the reaction may be carried out at least temporarily in the presence of a vulcanization inhibitor. Vulcanization inhibitors suitable for this purpose are also known from the technical field of rubber vulcanization. The use of such compounds is described, for example, in German Patent Application Nos. DE 10 2011 075 053 A1 and DE 10 2012 209 642 A1.

Furthermore, viscosity modifiers may be added to the sulfur for improving the reaction properties. These allow for the sulfur to be liquefied at low temperatures. At temperatures that are only slightly above the melting point of sulfur (for example in a range of 1 to 50° C. above the melting point of sulfur at a given pressure), sulfur normally has an undesirably high viscosity. The latter is disadvantageous in the reaction since it renders a uniform intermixture of the reaction mixture difficult. Although the increase of the reaction temperature effects a reduction of the viscosity of the liquid sulfur, it is associated with a rapid shortening of the sulfur chains. This effect acts counter to the aim of the present invention and is therefore not desired. Viscosity modifiers may therefore be added advantageously to the sulfur, which set the viscosity to a suitable degree even at low temperatures. The viscosity modifiers are able to break the sulfur chains and rings in a controlled manner at low temperatures and thus to control the viscosity in a targeted manner.

Suitable viscosity modifiers are nucleophilic compounds such as phosphorous nucleophiles for example (e.g., phosphines), sulfur nucleophiles (e.g. thiols) or nitrogen nucleophiles (e.g. primary or secondary amines).

Examples of suitable nucleophilic viscosity modifiers include triphenylphosphine, aniline, benzothiol, N,N-dimethylaminopyridine. To a certain degree, the reduction of the viscosity at low temperatures may also be achieved by the addition of monofunctional epoxides or thiiranes such as for example styrene oxide, glycidyl phenyl ether, t-butyl thiirane or phenoxymethyl thiirane, before these result in an increase of the viscosity by way of a cross-linkage or linkage of the sulfur chains.

Nucleophilic viscosity modifiers may be used for example in a quantity from approximately 0 to approximately 10% by weight, in particular from approximately 0.1 to approximately 5% by weight, particularly preferably from approximately 0.3 to approximately 0.5% by weight, relative to the total quantity of used sulfur.

Multiple methods are available for producing the cross-linked polyacrylonitrile sulfur composite material. In principle, the method of production may be single-stage or multi-stage, a cross-linking agent, including at least one functional group selected from an ethylenically unsaturated functional group, an epoxy group and a thiirane group, being added in at least one step.

Within the scope of one specific embodiment, the reaction is carried out at least temporarily in the presence of the previously defined cross-linking agents.

In principle, in one specific embodiment of the present invention, the reaction may be a single-stage synthesis, for example analogous to the one described in German Patent Application No. DE 10 2012 209 642 A1. For this purpose, polyacrylonitrile is reacted with sulfur and at least one cross-linking agent having at least one functional group, selected from an ethylenically unsaturated functional group, an epoxy group and a thiirane group, in order thus to obtain a cross-linked polyacrylonitrile-sulfur composite material, the reaction temperature being preferably selected at least temporarily to be in a range from greater than or equal to 300° C. to smaller than or equal to 550° C. Preferably, the temperature is at least temporarily in a range from 400° C. to 500° C. The reaction preferably occurs in an inert gas atmosphere. In one preferred specific embodiment, this single-stage reaction occurs in such a way that an escape of gaseous sulfur or gaseous cross-linking agent is effectively prevented, for example in a pressure vessel.

A multi-stage synthesis is likewise possible however. For example, in another preferred specific embodiment, the method may include a first method step, in which polyacrylonitrile is reacted with sulfur to form a polyacrylonitrile-sulfur composite material at a temperature in a range from greater than or equal to 300° C. to smaller than or equal to 550° C., in particular in a range from greater than or equal to 400 to smaller than or equal to 500° C. In another method step, the polyacrylonitrile-sulfur composite material thus obtained may then be reacted with the at least one cross-linking agent, including at least one functional group, selected from an ethylenically unsaturated functional group, an epoxy group and a thiirane group, at a temperature in a range from ≥120° C. to ≤250° C., in particular from ≥150° C. to ≤250° C., for example from ≥180° C. to ≤200° C. in order to obtain a cross-linked polyacrylonitrile-sulfur composite material. The reaction of the polyacrylonitrile-sulfur composite material obtained in the first method step with the at least one cross-linking agent preferably occurs with the addition of additional sulfur. The reaction preferably occurs in an inert gas atmosphere.

In another specific embodiment, the method may include a first method step, in which sulfur is reacted with at least one cross-linking agent, at a temperature in a range from ≥120° C. to ≤250° C., in particular from ≥150° C. to ≤250° C., for example from ≥180° C. to ≤200° C., followed by a reaction of the obtained reaction product with polyacrylonitrile at a temperature in a range from greater than or equal to 300° C. to smaller than or equal to 550° C., in particular in a range from greater than or equal to 400° C. to smaller than or equal to 500° C., to form a cross-linked polyacrylonitrile-sulfur composite material. The reaction of the reaction product, obtained in the first method step, of sulfur and cross-linking agent with the polyacrylonitrile preferably occurs with the addition of additional sulfur. The reaction preferably occurs in an inert gas atmosphere.

The sulfur atoms in the cross-linked polyacrylonitrile-sulfur composite material may be bonded to the cyclized polyacrylonitrile skeleton both directly by covalent sulfur-carbon bonds as well as indirectly by one or more covalent sulfur-sulfur bonds and one or more sulfur-carbon bonds.

Alternatively or additionally, a portion of the sulfur atoms of the cross-linked polyacrylonitrile-sulfur composite material, for example in the form of polysulfide chains, may be covalently bound bilaterally in an intramolecular manner to a cyclized polyacrylonitrile, particularly with the formation of an S-heterocycle annellized to the cyclized polyacrylonitrile, and/or in an intramolecular manner to two cyclized polyacrylonitrile chains, particularly with the formation of a bridge, in particular a polysulfide bridge, between the cyclized polyacrylonitrile chains.

The cross-linking agent molecules allow for a lengthening and/or cross-linkage of the sulfur chains in that the cross-linking agent molecules react with the sulfur chains via the at least one functional group selected from an ethylenically unsaturated functional group, an epoxy group and a thiirane group. If the cross-linking agent includes one such functional group, an lengthening of the sulfur chain is thus achieved by the reaction with two sulfur chains, the cross-linking agent acting as link in the process. If the cross-linking agent includes multiple functional groups of this kind, a mutual cross-linkage of multiple sulfur chains is achieved.

In each of the previously described methods, it is possible first for a reaction to occur of pure non-cyclized polyacrylonitrile to cyclized polyacrylonitrile (also called cyclization below) in the absence of sulfur, which is subsequently used as polyacrylonitrile in the methods of the present invention. Accordingly, the designation "polyacrylonitrile" in the context of this invention refers both to non-cyclized as well as to cyclized polyacrylonitrile. The reaction of non-cyclized polyacrylonitrile to sulfur-free cyclized polyacrylonitrile may occur in particular in an oxygen-containing atmosphere, for example in an air or oxygen atmosphere. In this context, the cyclization may occur for example at a temperature in a range from greater than or equal to 150° C. to smaller than or equal to 500° C., in particular from greater than or equal to 150° C. to smaller than or equal to 330° C. or smaller than or equal to 300° C. or smaller than or equal to 280° C., for example from greater than or equal to 230° C. to smaller than or equal to 270° C. The reaction time of the first method step may advantageously amount to less than 3 h, particularly less than 2 h, for example, less than 1 h. In particular, the cyclization may occur in the presence of a cyclization catalyst. Catalysts known from carbon fiber preparation may be used, for example, as cyclizing catalysts. The addition of a cyclization catalyst is advantageously able to reduce the reaction temperature and/or the reaction time in the cyclization.

The reaction mixture is advantageously mixed occasionally or continuously during the cyclization.

The reaction of the sulfur with the cross-linking agent and/or the polyacrylonitrile may occur in particular in the presence of a vulcanization catalyst or vulcanization accelerator. A vulcanization catalyst or accelerator is advantageously used in particular when the polyacrylonitrile is a cyclized polyacrylonitrile. If the reaction occurs in the presence of a vulcanization catalyst, then it is possible to reduce the reaction temperature to ≥120° C. to ≤250° C., in particular ≥150° C. to ≤250° C., for example ≥180° C. to ≤200° C.

Suitable catalysts are known from the technical field of rubber vulcanization. The reaction is therefore preferably carried out at least temporarily in the presence of a vulcanization catalyst or a vulcanization accelerator. In particular, the vulcanization catalyst or vulcanization accelerator may include at least one sulfide radical starter or be made of the latter. The sulfide radical starter may in particular be selected from the group composed of metal sulfide complexes, obtainable for example by the reaction of zinc oxide (ZnO) and tetramethylthiuram disulfide or N.N-dimethylthiocarbamate, sulfenamides, for example 2-mercaptobenzothiazole amine derivatives, and combinations thereof. For example, the reaction mixture may include zinc oxide at greater than or equal to 3% by weight to smaller than or equal to 5% by weight and, if applicable, tetramethylthiuram disulfide at greater than or equal to 0.5% by weight to smaller than or equal to 1% by weight.

In order to lower the reaction speed or to terminate a reaction phase having a reaction speed that is increased, for example, by the catalyst, the reaction may be carried out at least temporarily in the presence of a vulcanization inhibitor. Vulcanization inhibitors suitable for this purpose are also known from the technical field of rubber vulcanization. For example, N-(cyclohexylthio)phthalimide may be used as vulcanization inhibitor. Because of the use of, and the duration of the use of, the catalyst, particularly the vulcanization catalyst or vulcanization accelerator and/or vulcanization inhibitor, it is possible specifically to set the properties of the polyacrylonitrile-sulfur composite material. If necessary, the catalyst and, if necessary, the inhibitor are partially or entirely removed in a removal step.

The vulcanization may occur in particular in an inert gas atmosphere, for example in an argon or nitrogen atmosphere. Advantageously, the reaction time of the vulcanization may be less than 8 h, for example 1 h to 7 h, for example less than 3 h.

In a preferred specific embodiment, sulfur is reacted in a first step with a cross-linking agent at temperatures in the range from ≥120° C. to ≤250° C. Subsequently, the product of sulfur and cross-linking agent is reacted with polyacrylonitrile and additional sulfur to form cross-linked polyacrylonitrile-sulfur composite material at temperatures in the range from ≥300° C. bis ≤550° C. The reaction occurs preferably in the presence of one of the previously mentioned vulcanization catalysts. Both reaction steps preferably occur in an inert gas atmosphere.

The cross-linked polyacrylonitrile-sulfur composite material produced may furthermore be separated particularly from excess sulfur by purification. When using the cross-linked polyacrylonitrile-sulfur composite material as cathode material of an alkali-sulfur cell, unbound or elemental sulfur may react in the reduction with some electrolyte systems, which is why the choice of the electrolyte system is limited when unbound or elemental sulfur is present. By removing excess or unbound sulfur, advantageously additional or other electrolyte systems maybe used and/or properties of the alkali-sulfur cell, especially the cycle stability, may be improved.

If necessary, the catalyst and, if necessary, the inhibitor are likewise partially or entirely removed in the same removal step or in an additional removal step.

In particular, elemental sulfur may occur by way of a Soxhlet extraction, particularly using a nonpolar solvent or solvent mixture, for instance, toluol.

It is also possible, however, to leave the nonconverted or excess in the reaction mixture.

In one specific embodiment, the cross-linked polyacrylonitrile-sulfur composite material thus obtained includes:
- 35 to 75% by weight, preferably 40 to 70% by weight, in particular 45 to 60% by weight, relative to the total weight of the material, of covalently bonded sulfur;
- 0.01 to 15% by weight, preferably 0.1 to 10% by weight, in particular 0.5 to 1% by weight, relative to the total weight of the material, of cross-linking agent, which is bonded to the sulfur;
- 10 to 64.99% by weight, preferably 10 to 59.99% by weight, in particular 10 to 54.99% by weight, relative to the total weight of the material, of cyclized polyacrylonitrile, to which the sulfur is bonded covalently; and
- 0 to 10% by weight, preferably 0.01 to 1% by weight, in particular 0.02 to 0.1% by weight, relative to the total weight of the material, of additives, in particular viscosity modifiers and catalysts.

Another subject matter of the present invention is a polyacrylonitrile-sulfur composite material, for example for use as cathode material for an alkali-sulfur cell, in particular for a lithium-sulfur cell, obtained by the reaction of polyacrylonitrile with sulfur and at least one cross-linking agent, including at least one functional group, selected from an ethylenically unsaturated functional group, an epoxy group and a thiirane group. The cross-linked polyacrylonitrile-sulfur composite material according to the present invention may be produced in particular by a method according to the present invention. The method of the present invention advantageously makes it possible to bind polysulfide chains having a chain length of $\geq 3$ sulfur atoms, in particular $\geq 4$ or $\geq 5$ or $\geq 6$ or $\geq 7$ or $\geq 8$ or $\geq 9$ or $\geq 10$ sulfur atoms, covalently to the carbon skeleton of the cross-linked polyacrylonitrile-sulfur composite material.

Within the scope of another specific embodiment, therefore, in the cross-linked polyacrylonitrile-sulfur composite material, polysulfide chains having a chain length of $\geq 3$ sulfur atoms, in particular $\geq 4$ or $\geq 5$ or $\geq 6$ or $\geq 7$ or $\geq 8$ or $\geq 9$ or $\geq 10$ sulfur atoms, are covalently bonded to a or the carbon skeleton of the cross-linked polyacrylonitrile-sulfur composite material. In this manner, it is advantageously possible to achieve a particularly high proportion of covalently bonded sulfur and thus a high capacity and specific energy of the alkali-sulfur cell.

In the process, at least a portion of the sulfur atoms, for example in the form of polysulfide chains, may be covalently bonded unilaterally or bilaterally in an intramolecular manner to a cyclized polyacrylonitrile directly via a cross-linking agent molecule, particularly with the formation of an S-heterocycle annellized to the cyclized polyacrylonitrile, and/or bilaterally in an intramolecular manner to two cyclized polyacrylonitrile chains, particularly with the formation of a bridge, in particular a polysulfide bridge, between the cyclized polyacrylonitrile strands. For this purpose, the sulfur atoms may be connected both directly, by covalent sulfur-carbon bonds, as well as indirectly by one or more covalent sulfur-sulfur bonds, in particular of polysulfide chains, and one or more sulfur-carbon bonds to the cyclized polyacrylonitrile skeleton directly or via a cross-linking agent molecule.

A further subject matter of the present invention is a cathode material for an alkali metal-sulfur cell, particularly for a lithium-sulfur cell, which includes a polyacrylonitrile-sulfur composite material according to the present invention.

Furthermore, the cathode material may include at least one electrically conductive additive, especially selected from the group made up of soot, graphite, carbon fibers, carbon nanotubes and mixtures thereof.

In addition, the cathode material may include at least one binding agent, for instance, polyvinylidene fluoride (PVDF) and/or polytetrafluoroethylene (PTFE).

The cathode material may include, for example,
- $\geq 10\%$ by weight to $\leq 95\%$ by weight, for example $\geq 70\%$ by weight to $\leq 85\%$ by weight, of cross-linked polyacrylonitrile-sulfur composite material,
- $\geq 0.1\%$ by weight to $\leq 30\%$ by weight, for example $\geq 5\%$ by weight to $\leq 20\%$ by weight, of electrically conductive additives, and
- $\geq 0.1\%$ by weight to $\leq 30\%$ by weight, for example $\geq 5\%$ by weight to $\leq 20\%$ by weight, of binding agents.

In this instance, the sum of the weight-percentage values of cross-linked polyacrylonitrile-sulfur composite material, electrically conductive additives and binding agents may add up to a total of 100% by weight.

Within the scope of one embodiment, the cathode material may further include additional elemental sulfur. The presence of unbound elemental sulfur thus makes it possible advantageously to increase the voltage and capacity of the cell.

The cathode material may include, for example,
- $\geq 10\%$ by weight to $\leq 90\%$ by weight, for example $\geq 10\%$ by weight to $\leq 30\%$ by weight, of cross-linked polyacrylonitrile-sulfur composite material,
- $\geq 5\%$ by weight to $\leq 60\%$ by weight, for example $\geq 30\%$ by weight to $\leq 60\%$ by weight, of elemental sulfur,
- $\geq 0.1\%$ by weight to $\leq 30\%$ by weight, for example $\geq 5\%$ by weight to $\leq 20\%$ by weight, of electrically conductive additives, and
- $\geq 0.1\%$ by weight to $\leq 30\%$ by weight, for example $\geq 5\%$ by weight to $\leq 20\%$ by weight, of binding agents.

The sum of the weight-percentage values of cross-linked polyacrylonitrile-sulfur composite material, elemental sulfur, electrically conductive additives and binding agents, depending on the input, may in particular add up to a total of 100% by weight.

Another subject matter of the present invention is the use of a cross-linked polyacrylonitrile-sulfur composite material, produced according to one of the methods described above, as an active material in an electrode, in particular in a cathode of a lithium-based battery. Particularly as an active material, a cross-linked polyacrylonitrile-sulfur composite material produced in this manner is able to provide advantageous properties such as, for example, a good capacity and rate capability.

Another subject matter of the present invention is an energy store, in particular a lithium-sulfur battery, including an electrode having an active material, which features a cross-linked polyacrylonitrile-sulfur composite material produced as explained above.

In order to produce an energy store of this type, an active material produced as described above, in particular in the form of a cathode material slurry for producing a cathode, may furthermore include at least one solvent, for example N-methyl-2-pyrrolidone. Such a cathode material slurry may be applied, for instance by a doctor blade, to a carrier material such as an aluminum plate or foil. The solvents are preferably removed again after the application of the cathode material and prior to the assembly of the lithium-sulfur cell, preferably completely, by a drying method.

The cathode material-carrier material system may be subdivided subsequently to form multiple cathode material-carrier material units, by stamping or cutting for example.

The cathode material-carrier material system or the cathode material-carrier material units maybe installed with a lithium metal anode, the latter for example in the form of a plate or foil made of metallic lithium, to form a lithium-sulfur cell. Such a lithium-sulfur cell furthermore includes a separator that separates the cathode and the anode from each other.

An electrolyte may be added that will be explained below.

The anode may particularly be an alkali metal anode, especially a lithium metal anode, for example, in the form of a plate or foil, made, for instance, of metallic lithium.

The alkali metal-sulfur cell or battery may include an electrolyte, in particular of at least one electrolytic solvent and at least one conducting salt. Fundamentally, the electrolytic solvent may be selected from the group made up of carbonic acid esters, particularly cyclic or acyclic carbonates, lactones, ethers, particularly cyclic or acyclic ethers and combinations thereof. The electrolytic solvent may include diethyl carbonate (DEC), dimethyl carbonate (DMC), propylene carbonate (PC), ethylene carbonate (EC), 1,3-dioxolane (DOL), 1,2-dimethoxyethane (DME) or a combination thereof, or it may be made thereof. The conducting salt may be selected, for example, from the group made up of lithium hexafluorophosphate (LiPF$_6$), lithium bis(trifluoromethylsulfonyl)imide (LiTFSI), lithium tetrafluoroborate (LiBF$_4$), lithium trifluoromethanesulfonate (LiCF$_3$SO$_3$), lithium chlorate (LiClO$_4$), lithium bis(oxalato) borate (LiBOB), lithium fluoride (LiF), lithium nitrate (LiNO$_3$), lithium hexafluoroarsenate (LiAsF$_6$) and combinations thereof.

Furthermore, the electrolytic solvent may be selected from the group made up of cyclic ethers, acyclic ethers and combinations thereof, and/or the conducting salt may include lithium bis(trifluoromethylsulphonyl)imide (LiTFSI). This electrolytic solution agent and this conducting salt have proven advantageous for cathode materials according to the present invention, particularly in order to avoid reactions between the elemental sulfur and the electrolyte.

An energy store producible in this manner may be in particular a mobile or stationary energy store, which includes an alkali metal-sulfur cell or alkali metal-sulfur battery according to the present invention, particularly a lithium-sulfur cell or lithium-sulfur battery. For example, the energy store may be an energy store for a vehicle, for example an electric or hybrid vehicle, or an electric tool or device, for example a screw driver or a gardening tool, or an electronic device, for example a portable computer and/or a telecommunications device such as a mobile telephone, a PDA, or a high-energy storage system for a house or a plant. Since the alkali metal-sulfur cells or batteries according to the present invention have a very high specific energy, they are particularly suitable for vehicles and stationary storage systems such as high-energy storage systems for houses or plants.

The example methods according to the present invention make it possible to obtain polyacrylonitrile-sulfur composite materials, in which a comparatively high quantity of sulfur is incorporated into the formed matrix of the cross-linked polyacrylonitrile-sulfur composite material. This makes it possible, for example in the purely exemplary use of the cross-linked polyacrylonitrile-sulfur composite material as an active material, to provide a particularly high capacity in a lithium-based battery, for example. It is possible to implement this in particular without influencing other reaction parameters negatively.

Conventional methods for producing polyacrylonitrile-sulfur composite materials produce materials that normally have a proportion of covalently bonded sulfur from 35 to 40% by weight. Adding at least one cross-linking agent during the production process promotes the formation of covalent bonds between sulfur and carbon atoms. This has the result that the quantity of sulfur bonded covalently to the polyacrylonitrile sulfur composite material may be markedly increased. Thus, for example, cross-linked polyacrylonitrile-sulfur composite materials having a proportion of covalently bonded sulfur of ≥35% by weight, in particular ≥40% by weight, preferably ≥45% by weight and ≤75% by weight, relative to the total weight of the material, are obtained.

In one specific embodiment, the cross-linked polyacrylonitrile-sulfur composite material includes:
  35 to 75% by weight, preferably 40 to 70% by weight, in particular 45 to 60% by weight, relative to the total weight of the material, of covalently bonded sulfur;
  0.01 to 15% by weight, preferably 0.1 to 10% by weight, in particular 0.5 to 1% by weight, relative to the total weight of the material, of cross-linking agent, which is bound to the sulfur;
  10 to 64.99% by weight, preferably 10 to 59.99% by weight, in particular 10 to 54.99% by weight, relative to the total weight of the material, of cyclized polyacrylonitrile; and
  0 to 10% by weight, preferably 0.01 to 1% by weight, in particular 0.02 to 0.1% by weight, relative to the total weight of the material, of additives, in particular viscosity modifiers and catalysts.

The reaction of sulfur with the at least one cross-linking agent in particular counteracts the effect that at a high reaction temperature of sulfur and polyacrylonitrile comparatively little sulfur is bound in the matrix of the cross-linked polyacrylonitrile-sulfur composite material. A reason for this may be seen particularly in the fact that at higher temperatures, at which conventional methods for producing polyacrylonitrile-sulfur composite materials, the chain lengths of the sulfur molecules become shorter and thus the sulfur content in the matrix or the skeleton is reduced. The reason for this is that elemental sulfur is present at room temperature in the form of S$_8$ rings. At temperatures above room temperature, the sulfur is present in the form of S$_x$ chains of medium chain length, for instance, from 6 to 26 sulfur atoms, or greater chain length, such as from 103 to 106 sulfur atoms. Above 187° C., a thermal cracking process begins, and the chain length comes down again. Beginning at 444.6° C. (the boiling point of sulfur) gaseous sulfur is present at a chain length of 1-8 atoms.

The addition of a cross-linking agent advantageously makes it possible to lengthen the chain length of the sulfur chains in that these are linked to one another with the aid of the cross-linking agent. Without being bound to this theory, it is assumed that the cross-linking agent in the method of the invention enters a bond with the sulfur, it being possible for this reaction to occur already at temperatures at which the reaction of sulfur and polyacrylonitrile to form polyacrylonitrile-sulfur composite materials known from the conventional methods does not yet occur. The organic sulfur compounds thus formed are characterized in comparison to elemental sulfur by a different reactivity with respect to the polyacrylonitrile. The organic sulfur compounds also have a different behavior with respect to higher reaction temperatures. Lowering the reaction temperature additionally makes it possible to increase the chain length of the polysulfides that are covalently bonded to the cross-linking agent and later also to the polyacrylonitrile. In particular, the method according to the present invention makes it possible to bind polysulfide chains having a chain length of ≥3 sulfur atoms, in particular ≥4 or ≥5 or ≥6 or ≥7 or ≥8 or ≥9 or ≥10 sulfur atoms covalently to carbon atoms of the cross-linked polyacrylonitrile-sulfur composite material. Thus, in turn, a higher sulfur content may advantageously be achieved in the polyacrylonitrile-sulfur composite material.

The present invention is not restricted to the preferred exemplary embodiment described here and the aspects emphasized therein. Rather, a multitude of variations are possible that lie within the scope of the actions of one skilled in the art.

What is claimed is:

1. A polyacrylonitrile-sulfur composite material, comprising:
   cyclized polyacrylonitrile;
   sulfur; and
   at least one cross-linking agent, wherein the polyacrylonitrile-sulfur composite material is formed by a reaction between the polyacrylonitrile, the sulfur, and the at least one cross-linking agent, and wherein the cross-linking agent, prior to the reaction, includes a functional group selected from an ethylenically unsaturated functional group, an epoxy group, and a thiirane group.

2. The polyacrylonitrile-sulfur composite material as recited in claim 1, wherein the cross-linking agent binds at least two sulfur atoms to one another, which are furthermore bonded directly or indirectly to the cyclized polyacrylonitrile.

3. A polyacrylonitrile-sulfur composite material, comprising:
   35 to 75% by weight, relative to the total weight of the material, of covalently bonded sulfur;
   0.01 to 15% by weight, relative to the total weight of the material, of a non-sulfur cross-linking agent, which is bonded to the sulfur;
   10 to 64.99% by weight, relative to the total weight of the material, of cyclized polyacrylonitrile to which the sulfur is covalently bonded; and
   0 to 10% by weight, relative to the total weight of the material, of additives, selected from viscosity modifiers and catalysts.

4. A method comprising:
   producing a cross-linked polyacrylonitrile-sulfur composite material, wherein the producing comprises reacting polyacrylonitrile with sulfur and at least one cross-linking agent to form a cross-linked polyacrylonitrile-sulfur composite material, the cross-linking agent including a functional group selected from an ethylenically unsaturated functional group, an epoxy group, and a thiirane group.

5. The method as recited in claim 4, wherein the polyacrylonitrile, the sulfur, and the at least one cross-linking agent are reacted in one reaction step to form the cross-linked polyacrylonitrile-sulfur composite.

6. The method as recited in claim 4, wherein, in a first reaction step, the sulfur is reacted with the at least one cross-linking agent and the product obtained thereby is reacted in a second reaction step with polyacrylonitrile and additional sulfur in order to form the cross-linked polyacrylonitrile-sulfur composite.

7. The method as recited in claim 4, wherein, in a first reaction step, the polyacrylonitrile and the sulfur are reacted to form a polyacrylonitrile-sulfur composite and the product obtained thereby is reacted in a second reaction step with additional sulfur and the at least one cross-linking agent to form the cross-linked polyacrylonitrile-sulfur composite.

8. The method as recited in claim 4, wherein the method is carried out at least temporarily at a temperature from 300° C. to 550° C.

9. The method as recited in claim 4, wherein the at least one cross-linking agent is an aromatic or aliphatic hydrocarbon compound including at least one functional group, selected independently of one another from an ethylenically unsaturated functional group, an epoxy group and a thiirane group.

10. The method as recited in claim 4, wherein the cross-linked polyacrylonitrile-sulfur composite material has a content of covalently bonded sulfur of more than 35% by weight.

11. A polyacrylonitrile-sulfur composite material, produced by reacting polyacrylonitrile with sulfur and at least one cross-linking agent to form a cross-linked polyacrylonitrile-sulfur composite material, the cross-linking agent including a functional group selected from an ethylenically unsaturated functional group, an epoxy group, and a thiirane group.

12. A cathode material for a lithium-sulfur cell, comprising:
   a polyacrylonitrile-sulfur composite material (a) including a cyclized polyacrylonitrile, sulfur, and at least one cross-linking agent formed by a reaction between the polyacrylonitrile, the sulfur, and the at least one cross-linking agent, wherein the at least one cross-linking agent, prior to the reaction, includes a functional group selected from an ethylenically unsaturated functional group, an epoxy group, and a thiirane group.

13. A lithium-sulfur cell, comprising:
   a lithium-containing anode; and
   a cathode, the cathode including a cathode material including a polyacrylonitrile-sulfur composite material, the polyacrylonitrile-sulfur composite material including a cyclized polyacrylonitrile, sulfur, and at least one cross-linking agent formed by a reaction between the polyacrylonitrile, the sulfur, and the at least one cross-linking agent, wherein the at least one cross-linking agent, prior to the reaction, includes a functional group selected from an ethylenically unsaturated functional group, an epoxy group, and a thiirane group.

14. The method as recited in claim 4, wherein the cross-linked polyacrylonitrile-sulfur composite material produced by the method includes cyclized polyacrylonitrile sulfur.

15. The method as recited in claim 14, further comprising arranging the produced cross-linked polyacrylonitrile-sulfur composite material as part of a cathode of a lithium-sulfur cell.

16. The method as recited in claim 15, wherein the lithium-sulfur cell includes a lithium-containing anode.

17. The method as recited in claim 16, wherein the lithium-sulfur cell is an energy store.

18. The method as recited in claim 4, wherein the reacting includes the cross-linking agent binding to one another at least two sulfur atoms that are also bonded directly or indirectly to cyclized polyacrylonitrile.

19. The method as recited in claim 4, wherein the produced cross-linked polyacrylonitrile-sulfur composite material includes:
- 35-75% by weight, relative to a total weight of the material, of the sulfur, which is a covalently bonded sulfur;
- 0.01-15% by weight, relative to the total weight of the material, of the cross-linking agent, which is bonded to the sulfur; and
- 10-64.99% by weight, relative to the total weight of the material, of the polyacrylonitrile, which is cyclized polyacrylonitrile to which the sulfur is covalently bonded.

20. The method as recited in claim 19, wherein the produced cross-linked polyacrylonitrile-sulfur composite material further includes additives selected from viscosity modifiers and catalysts, the additives being present in an amount up to 10% by weight relative to the total weight of the material.

21. The method as recited in claim 4, wherein the functional group includes at least two functional groups that are each selected independently of one another from the ethylenically unsaturated functional group, the epoxy group, and the thiirane group.

22. The polyacrylonitrile-sulfur composite material as recited in claim 1, wherein the functional group includes at least two functional groups that are each selected independently of one another from the ethylenically unsaturated functional group, the epoxy group, and the thiirane group.

23. The polyacrylonitrile-sulfur composite material as recited in claim 11, wherein the functional group includes at least two functional groups that are each selected independently of one another from the ethylenically unsaturated functional group, the epoxy group, and the thiirane group.

24. The cathode material as recited in claim 12, wherein the functional group includes at least two functional groups that are each selected independently of one another from the ethylenically unsaturated functional group, the epoxy group, and the thiirane group.

25. The lithium-sulfur cell as recited in claim 13, wherein the functional group includes at least two functional groups that are each selected independently of one another from the ethylenically unsaturated functional group, the epoxy group, and the thiirane group.

26. The polyacrylonitrile-sulfur composite material as recited in claim 3, wherein the cross-linking agent includes a functional group selected from an ethylenically unsaturated functional group, an epoxy group, and a thiirane group.

27. The polyacrylonitrile-sulfur composite material as recited in claim 26, wherein the functional group includes at least two functional groups that are each selected independently of one another from the ethylenically unsaturated functional group, the epoxy group, and the thiirane group.

* * * * *